Patented Oct. 19, 1954

2,692,282

UNITED STATES PATENT OFFICE 2,692,282

N-CYCLOHEXYLCYCLOPROPANE-
CARBOXAMIDE

Weldon G. Brown, Chicago, Ill., assignor to Commercial Solvents Corporation, Terre Haute, Ind., a corporation of Maryland No Drawing. Application December 21, 1953,
Serial No. 399,583

1 Claim. (Cl. 260—557)

My invention relates to the new compound N-cyclohexylcyclopropanecarboxamide.

My new compound is an intermediate in the production of the compound N-(cyclopropylmethyl) cyclohexylamine, an analgetic composition which does not cause undesirable toxic side reactions frequently encountered with other analgetics. The analgetic composition, N-(cyclopropylmethyl) cyclohexylamine is the subject matter of co-pending application Serial No. 372,396 filed August 4, 1953.

My new compound N-cyclohexylcyclopropanecarboxamide can be produced by any suitable means. I prefer to prepare the new compound by first reacting cyclopropanecarboxylic acid with thionyl chloride to produce cyclopropanecarbonyl chloride which latter material is then reacted with cyclohexylamine to produce N-cyclohexylcyclopropanecarboxamide.

My new compound N-cyclohexylcyclopropanecarboxamide is a white crystalline material having a melting point of 139.5–140° C. The analgetic composition, N-(cyclopropylmethyl) cyclohexylamine, can be produced from the N-cyclohexylcyclopropanecarboxamide by reducing the latter compound with lithium aluminum hydride by the method disclosed in Serial No. 372,396 mentioned above.

The following example is offered to illustrate the production of N-cyclohexylcyclopropanecarboxamide.

Example I

A 56-gram portion of thionyl chloride was heated on a water bath and to it was added over a period of one hour, 34 grams of cyclopropane carboxylic acid. The evolved gases were absorbed in water. When all of the acid was added, the mixture was heated for one-half hour on a water bath and then distilled to obtain crude cyclopropanecarbonyl chloride boiling between 70 and 110° C. The crude material was then purified by distillation to obtain 31.5 grams of cyclopropanecarbonyl chloride boiling at 109–112° C. A 25-gram portion of the cyclopropanecarbonyl chloride was added slowly to a stirred mixture of 50 grams of cyclohexylamine in 250 ml. of benzene. N-cyclohexylcyclopropanecarboxamide and cyclohexylamine hydrochloride precipitated. The precipitate was washed with water in which the cyclohexylamine hydrochloride dissolved leaving white crystalline N-cyclohexylcyclopropanecarboxamide which was recrystallized from 95% alcohol to obtain 30.5 grams of white crystalline N-cyclohexylcyclopropanecarboxamide having a melting point of 138–139° C. The compound was further purified by sublimation on the sides of a beaker heated on a steam plate to obtain a crystalline material having a melting point of 139.5–140° C.

Analyses of the crystalline material thus obtained was as follows C—71.87%; H—10.32%; N—8.32%; O (by difference)—9.49%. Calculated for N - cyclohexylcyclopropanecarboxamide: C—71.81%; H—10.25%; N—8.38%; O—9.56%.

The following example is offered to show the method for the production of N-(cyclopropylmethyl) cyclohexylamine from N-cyclohexylcyclopropanecarboxamide.

Example II

A 15-gram portion of N-cyclohexylcyclopropanecarboxamide was run into a refluxing solution of 4 grams of lithium aluminum hydride in 400 ml. of ether by means of Soxhlet apparatus, the addition being made over a period of about 15 hours. At the end of this period, excess hydride was destroyed with water and 10% sodium hydroxide added to dissolve the alumina. The ether layer was then separated and the basic layer washed several times with 75-ml. portions of ether. The ether extracts were combined and evaporated to obtain a residue which was treated with 5% aqueous solution of hydrochloric acid. The resulting solution was filtered to remove 3.7 grams of unreacted amides. The solution was then neutralized with sodium hydroxide, extracted with ether and the ether evaporated to obtain 9.0 grams of N-(cyclopropylmethyl) cyclohexylamine as a liquid oil.

Now having described my invention, what I claim is:

N-cyclohexylcyclopropanecarboxamide.

No references cited.